H. E. DAVIS AND H. A. HARTMAN.
SHUTTERS FOR MOTION PICTURE MACHINES.
APPLICATION FILED APR. 17, 1920.
1,356,343.
Patented Oct. 19, 1920.
2 SHEETS—SHEET 1.
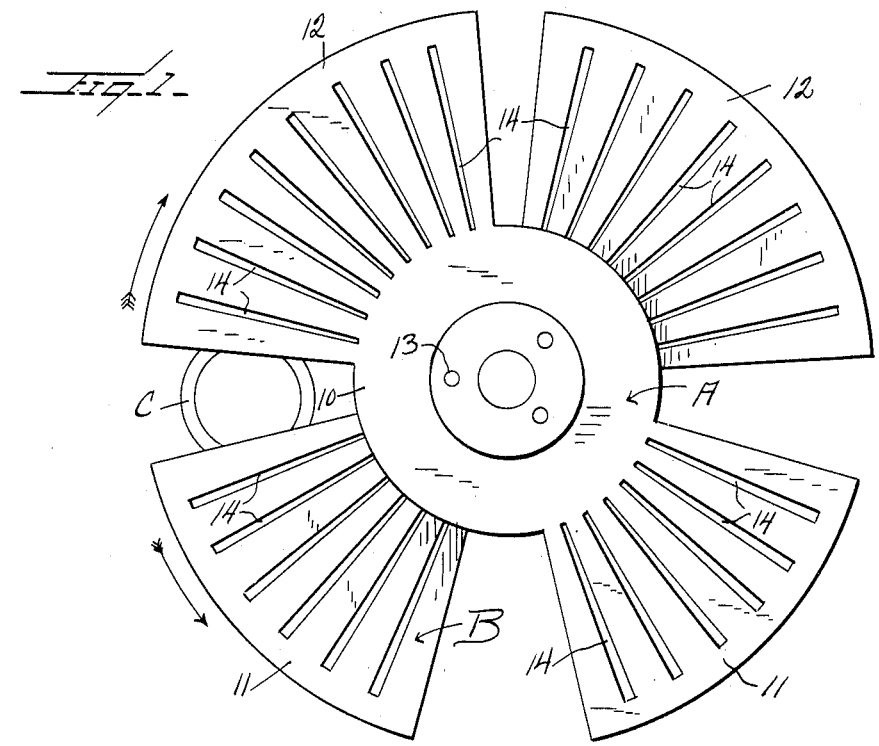
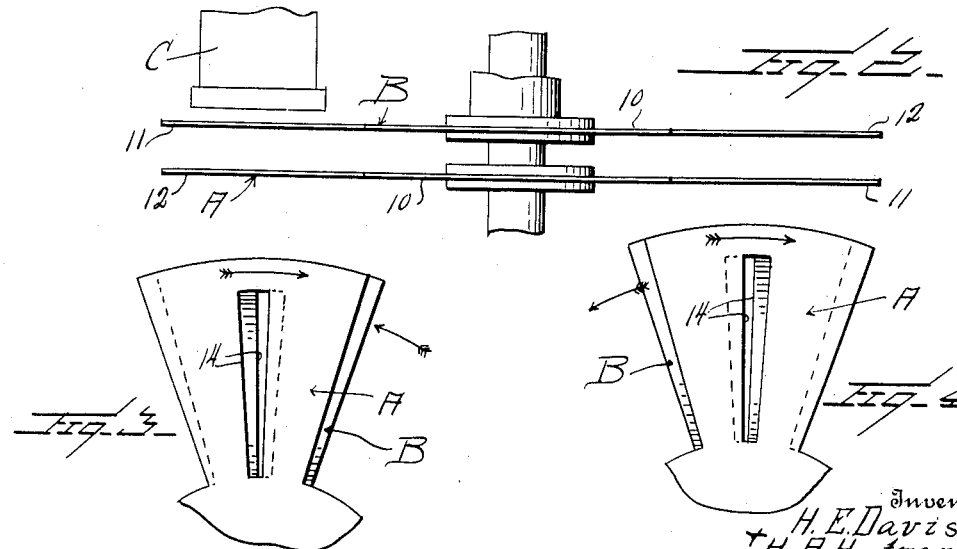
Inventors
H. E. Davis
H. A. Hartman.
By Watson E. Coleman
Attorney

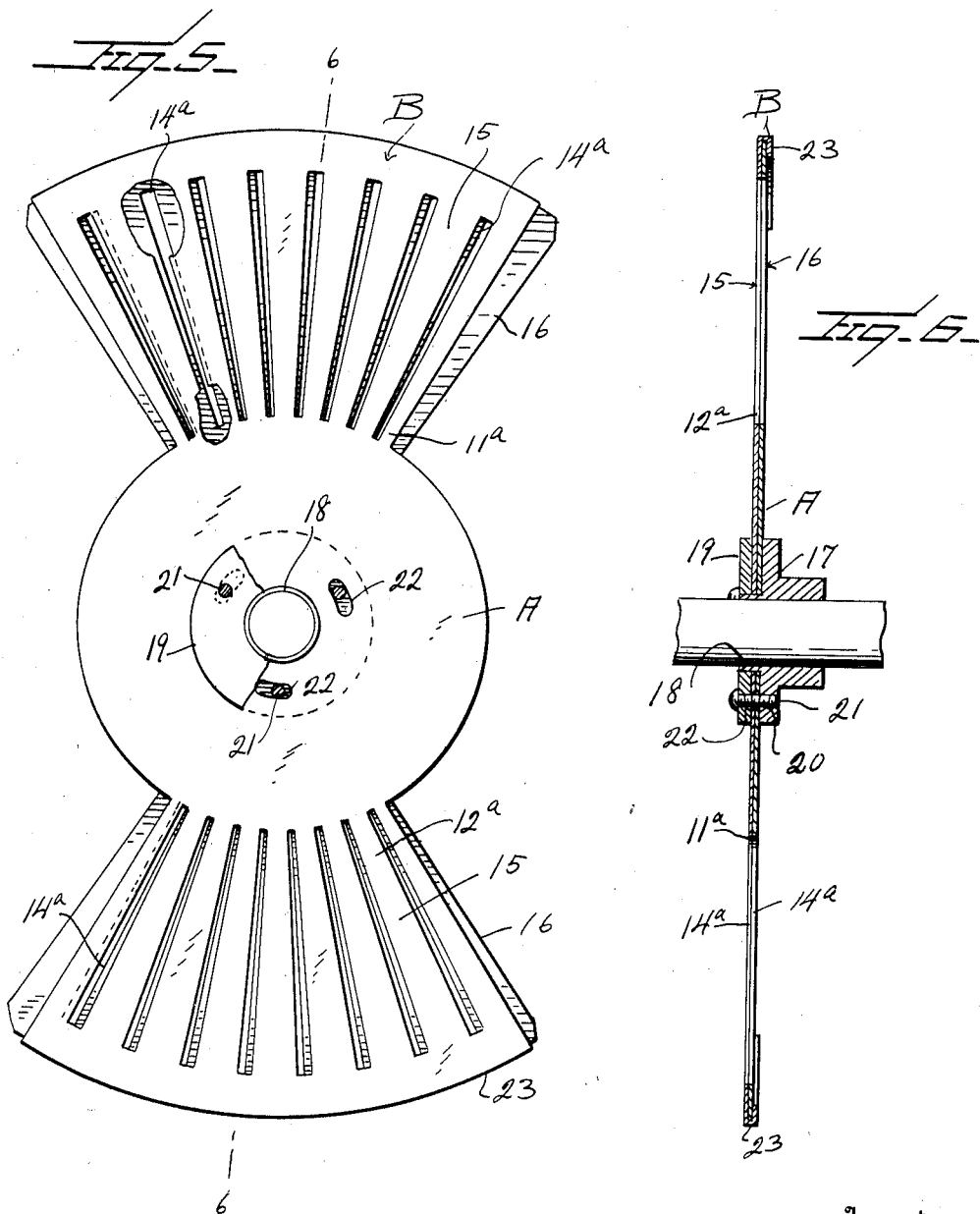

UNITED STATES PATENT OFFICE.

HARRY E. DAVIS AND HARRY A. HARTMAN, OF MILTON, PENNSYLVANIA.

SHUTTERS FOR MOTION-PICTURE MACHINES.

1,356,343.   Specification of Letters Patent.   Patented Oct. 19, 1920.

Application filed April 17, 1920. Serial No. 374,649.

*To all whom it may concern:*

Be it known that we, HARRY E. DAVIS and HARRY A. HARTMAN, citizens of the United States, residing at Milton, in the county of Northumberland and State of Pennsylvania, have invented certain new and useful Improvements in Shutters for Motion-Picture Machines, of which the following is a specification, reference being had to the accompanying drawings.

This invention relates to motion picture apparatus, and particularly to the shutters of motion picture machines.

The shutter ordinarily used today on practically all motion picture machines is a single, rotating shutter having a plurality of imperforate blades extending radially therefrom. It is well known that these imperforate blades make such sharp contrasts in light and shade when the light is cut off or permitted to pass that there is considerable "flicker," particularly unless the shutter is rotated at a high rate of speed, which involves, of course, the travel of the film at a relatively high rate of speed. To avoid this, double shutters have been suggested, each shutter having a plurality of vanes or blades, these vanes or blades being sawtoothed on their edges. It has also been suggested to use a single shutter having obscuring vanes or blades which are formed of reticulated material which, in theory, permits a certain amount of light to pass to the screen during the time when the reticulated material or blade is crossing the lens, thus reducing the contrast between the period when the screen is fully illuminated and when the light is obscured.

The object of the present invention is to avoid flicker by reducing the contrast between the fully illuminated screen and the screen at the time when the light is obscured, thus securing more brilliant pictures.

And a further object is to provide a double shutter of such character as will secure a more even lighting of the screen at all times and yet which will do away with any "travel ghosts," that is any lines, shadows or other markings apparently moving vertically across the screen or in any way across the screen.

A further object of the invention is to provide a shutter provided with apertured blades, and provide means whereby the effective aperture of the blade may be varied so as to provide for variations in the amount of light allowed to play on the screen at the time when the blade is passing the projecting lens.

Other objects will appear in the course of the following description.

Our invention is illustrated in the accompanying drawings, wherein:—

Figure 1 is a front view of a moving picture shutter mechanism constructed in accordance with our invention;

Fig. 2 is a fragmentary top plan view of the construction shown in Fig. 1;

Figs. 3 and 4 are views showing the manner in which the light apertures increase and decrease in width;

Fig. 5 is a face view of a preferable form of shutter, the center of the shutter being partly broken away;

Fig. 6 is a section on the line 6—6 of Fig. 5.

Referring to these drawings, and particularly to Fig. 1, it will be seen that the shutter which we have illustrated is a double shutter, that is it is composed of the shutters A and B mounted in such manner that the shutters will rotate in opposite directions but at the same rate of speed. Such a shutter mounting is fully described and illustrated in the patent granted to Harry A. Hartman and Harry E. Davis on February 10, 1920, #1,330,519. The shutters are disposed approximately half an inch from each other and at any desired distance from the projector lens C. We do not wish, of course, to be limited to any particular means for rotating the shutters in opposite directions. Each shutter A or B is made of thin metal and is a duplicate of the other shutter of the pair. Each shutter comprises a central, annular portion 10 with vanes or blades 11 and 12. The blade 12 is wider than the blade 11, and it is these blades 12 of the two shutters which pass each other at the time when the film is being shifted. The annular portion 10 of each shutter is formed with perforations 13 whereby it may be operatively connected to the shaft upon which it operates by screws, bolts or other attaching means, and each blade 11 and 12 is formed with a series of radially extending slots 14, each slot being narrower at its inner end that it is at its outer end, and each slot extending nearly the full length of the corresponding blade. We do not wish to be limited to the number of these slots and the width of the slots may be varied to suit different circumstances of operation.

If it is desired to secure a very brilliant lighting of the screen, the slots are relatively wide. If a lower tone for the screen is desired, the slots are relatively narrow. We may have sets of these shutters made having varying sized slots 14 so that a proper shutter may be used with any certain film to which it is best adapted, as films differ in tone and, therefore, the quantity of light which is to be thrown on the screen during the period when the shutters are crossing the lens requires to be varied.

It is to be particularly noted that as the blades or vanes cross each other, the effective aperture for the light will be first in the form of a very narrow slot tapering toward its center so acutely that practically no light is admitted at the inner ends of the slots, and that when the slots 14 in one blade fully register with the slots 14 in the other blade, a maximum projection of light upon the screen will occur, and that as the apertures close, the light will be cut off at the inner portion of each aperture first and gradually the light will diminish outward. This is shown diagrammatically in Figs. 3 and 4. Thus, the light plays across the screen even at the time when the blades are crossing each other and the picture is being shifted, and there will not be any intense contrasts of light and dark. We do not wish to be limited to the use of vanes having the slots 14 extending radially on one or both shutters, though in actual practice we have found that radial slots give the best results.

When this double shutter constructed as herein described is used, we find that it enables us to run the pictures at a relatively slow rate of speed without any flicker. This is impossible with the ordinary forms of shutters where the pictures must be run at a relatively high rate of speed in order to avoid flicker, and "travel ghosts." It is often desirable to run pictures at a relatively slow rate of speed either in order to make the running of the picture fill a certain period of time or because the action of the picture requires that the film should be run relatively slowly. This shutter permits the film to be run either at the usual rate of speed, at a higher rate of speed than usual, or at a lower rate of speed than usual.

In Figs. 5 and 6 we show another form of the shutter which we believe to be of particular value, inasmuch as it permits the adjustment of the effective opening through the slots in the blades. In these figures we have only illustrated one of the shutters, but it is to be understood that the shutters are to be used in pairs, as previously stated.

Referring to these figures, A designates the body of the shutter and B the blade or vane. This shutter is composed of two sections 15 and 16, each of these sections being provided with the vanes 11$^a$ and 12$^a$. In this embodiment of the invention, both the vanes are of the same width transversely. Each of the vanes of each of the shutter sections 15 and 16 is formed with the radially extending, inwardly tapering apertures or slots 14$^a$, as previously described. These two sections 15 and 16 of the shutter are superposed upon each other and held by an annulus 17 having a central sleeve 18 which passes through the two sections of the shutter, and by an oppositely disposed annulus 19. One of the shutter sections is formed with apertures 20 for the passage of the screws 21, while the other shutter section is formed with a series of arcuate slots 22 through which the screws 21 pass.

It will be seen that with this construction, a loosening of the screws 21 to reduce the clamping action of the two annuli will permit one of the shutter sections, as for instance, the shutter section 15 to be rotatably shifted relative to the other shutter section 16. By this means it is possible to adjust the slots 14$^a$ of one shutter section out of register with the slots 14$^a$ of the other shutter section so as to thereby diminish the effective aperture of the shutter. Thus, the effective aperture of the slots 14$^a$ may be decreased to a minimum or increased to the full width of the slots. After the shutter sections are rotatively adjusted, the screws are tightened up, which clamps the shutter sections in position so that they cannot possibly shift relative to each other. The two sections 15 and 16 constitute together one shutter. Preferably, one of the sections has returned ends 23 which extend over the arcuate edges of the other shutter section and hold the two shutter sections in intimate contiguity at their ends and practically form guides within which the other shutter sections are relatively adjustable.

By this means, the width of the slots 14$^a$ may be gaged and thus the amount of light projected on the screen may be regulated. By this mechanism there is no necessity of having two or three sets of shutters with slots of different widths to regulate the amount of light for different pictures, as this may be regulated by removing one set of shutters and replacing them with another by simply loosening the screws 21 and adjusting one section relative to the other to adjust the slots to any effective width required or close them entirely, making a solid shutter if necessary. The form of shutter which is illustrated in Figs. 5 and 6 is the most practical and effective where it is desirable to adjust the shutter to change the effective width of the shutters for different pictures.

I claim:—

1. A shutter mechanism for moving picture machines including two shutters revolving in opposite directions, shutters having radially extending vanes, each vane having a series of radially extending slots, the slots tapering toward their inner end.

2. A shutter mechanism for motion picture machines comprising two shutters rotating in opposite directions, each shutter having two radial vanes, one of said vanes being wider than the other vane on the same shutter and each of said vanes having a series of radial slots, the slots being tapering toward their inner ends, the vanes on one shutter having the same width as the vanes on the other shutter, and the slots on the vanes of one shutter being spaced the same distance apart as the slots on the vanes of the other shutter.

3. A shutter mechanism for moving picture machines including two shutters revolving in opposite directions, each of the shutters having an equal number of radially extending vanes, each of the vanes being provided with a series of slots extending approximately the entire length of the vane, each shutter consisting of two sections having radially slotted vanes, and one of said sections being adjustable with reference to the other section to thereby control the effective apertures through the vanes.

4. A shutter for moving picture machines comprising two sections disposed against each other, each section being provided with radially extending vanes and each vane being provided with a series of slots extending radially with relation to the center of rotation of the shutter, the sections being concentric to each other, and said sections being rotatively adjustable with relation to each other whereby to bring the slots of one section into or out of exact alinement with the slots of the other section, one of said sections being provided with screw holes and the other with arcuate slots, an annulus having a sleeve, the sleeve passing through the centers of the two sections, a second annulus fitting on the sleeve and disposed against the opposite shutter, and screws passing through the annuli and through the slots and apertures in the shutters.

5. A shutter for moving picture machines composed of two sections, each having radially extending vanes, and provided with a series of slots, the two sections being concentric to each other and one of said sections having the ends of the vanes turned over to embrace the ends of the vanes of the other section and form guides therefor, the two sections being rotatively adjustable relative to each other whereby to bring the slots of one section into or out of register with the slots of the other section, and means for clamping the sections in adjusted positions.

6. A shutter mechanism for moving picture machines including two shutters revolving in opposite directions, each shutter having radially extending vanes, each vane having a plurality of slots, the slots extending across the direction of rotation of the shutter.

In testimony whereof we hereunto affix our signatures.

HARRY E. DAVIS.
HARRY A. HARTMAN.